(12) United States Patent
Du et al.

(10) Patent No.: US 10,976,471 B2
(45) Date of Patent: Apr. 13, 2021

(54) POST-PROCESSING AIR QUALITY FORECASTS

(71) Applicant: International Business Machines Corporation, Armonk, NY (US)

(72) Inventors: Hui Du, Beijing (CN); Yu Du, Beijing (CN); Si Huang, Beijing (CN); Yu Jia Tang, Beijing (CN); Bao Guo Xie, Beijing (CN); Meng Zhang, Beijing (CN); Xin Zhang, Lafayette, CO (US); Shuai Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 15/451,735

(22) Filed: Mar. 7, 2017

(65) Prior Publication Data

US 2018/0259677 A1  Sep. 13, 2018

(51) Int. Cl.
*G01W 1/00* (2006.01)
*G01W 1/02* (2006.01)
*G01W 1/10* (2006.01)
*G01W 1/18* (2006.01)
*G06F 16/31* (2019.01)

(52) U.S. Cl.
CPC ............... *G01W 1/10* (2013.01); *G01W 1/18* (2013.01); *G01W 1/00* (2013.01); *G01W 1/02* (2013.01); *G06F 16/31* (2019.01); *G06F 16/313* (2019.01)

(58) Field of Classification Search
CPC .... G06F 16/24578; G06F 16/00; G06F 16/31; G06F 16/313; G01W 1/10; G01W 1/00; G01W 1/02; G01W 1/18; G01W 1/11
See application file for complete search history.

(56) References Cited

U.S. PATENT DOCUMENTS 6,581,008 B2   6/2003   Intriligator et al.
7,529,623 B2   5/2009   Tanahashi
(Continued)

OTHER PUBLICATIONS

Monache et al; A Kalman-filter bias correction method applied to deterministic, ensemble averaged and probabilistic forecasts of surface ozone, 2007.*
List of IBM Patents or Patent Applications Treated As Related.
Djalalova et al., "PM2.5 Analog Forecast and Kalman Filter Post-Processing for the Community Multiscale Air Quality (CMAQ) Model", Atmospheric Environment, vol. 119, Oct. 2015, pp. 431-442.
(Continued)

*Primary Examiner* — Mischita L Henson
*Assistant Examiner* — Lynda Dinh
(74) *Attorney, Agent, or Firm* — Scully, Scott, Murphy & Presser, P.C.; Joseph Petrokaitis, Esq.

(57) ABSTRACT

Post-processing corrections can be applied to operational numerical model forecasts of weather variables to reduce forecast model errors. The post-processing technique is based on an analog post-processing correction scheme. In the analog scheme, the system searches for previous model forecasts that are similar to the current forecast, and modifies the current forecast based on errors in such previous predictions. An "abnormal (or abnormal) index" can be generated for each analog as a function of several meteorology variables (i.e., humidity, pressure and temperature) and two experience coefficients. The abnormal index can be used to exclude some errors. Furthermore, dynamic weights based on the "abnormal index" can be applied to the errors. Using the "abnormal index" weights in a post-processing technique may generate a more accurate air quality forecast.

11 Claims, 4 Drawing Sheets

(56) References Cited

U.S. PATENT DOCUMENTS

| | | | |
|---|---|---|---|
| 7,542,852 | B1 | 6/2009 | Rose et al. |
| 8,666,666 | B2 | 3/2014 | Bassa |
| 8,775,082 | B2 | 7/2014 | Bishop |
| 9,274,251 | B2 | 3/2016 | Pasken et al. |
| 2006/0045801 | A1* | 3/2006 | Boyden ............... G05B 13/048 422/62 |
| 2009/0309744 | A1* | 12/2009 | Fu ........................ G08B 27/006 340/632 |
| 2011/0313958 | A1* | 12/2011 | Roverso ................. G01W 1/00 706/12 |
| 2012/0203461 | A1* | 8/2012 | Chan ...................... G01D 21/02 702/3 |
| 2015/0330817 | A1* | 11/2015 | Law ........................ G01W 1/00 702/3 |
| 2016/0041074 | A1 | 2/2016 | Pliskin |
| 2016/0091474 | A1* | 3/2016 | Griffon ............. G01N 33/0036 702/24 |

OTHER PUBLICATIONS

Delle Monache et al., "Analog-Based Postprocessing Methods for Air Quality Forecasting", Air Pollution Modeling and its Application XXIII, Part of the series Springer Proceedings in Complexity pp. 237-239 Date: Mar. 28, 2014, Abstract Only.

Delle Monache et al., "Kalman Filter and Analog Schemes to Postprocess Numerical Weather Predictions", Monthly Weather Review, 139(11), Nov. 2011, pp. 3554-3570.

Nagarajan et al., "An Evaluation of Analog-Based Postprocessing Methods across Several Variables and Forecast Models", American Meteorological Society, Dec. 2015, pp. 1623-1643.

Miller et al., "AQMOS: Air Quality Model Output Statistics From CMAQ Model Forecasts", 9th Annual CMAS Conference, Chapel Hill, NC, Oct. 11-13, 2010, pp. 1-5.

\* cited by examiner

POST-PROCESSING AIR QUALITY FORECASTS

BACKGROUND

This disclosure relates generally to air quality forecasting, and particularly to post-processing techniques for air quality forecasting.

Current techniques or improving air quality forecasts include post-processing correction techniques. For example, operational numerical model forecasts of weather variables, e.g., (PM2.5) predictions from the National Oceanic and Atmospheric Administration (NOAA) developmental air quality forecasting system using the Community Multiscale Air Quality (CMAQ) model, often have some type of post-processing corrections applied to them to reduce errors before information is disseminated. Such corrections can range from simple (arguably subjective) to complex (e.g., statistical regression) techniques.

One post-processing correction technique is sometimes referred to as analog post-processing. The basic concept behind analog post-processing is to search for previous air quality model forecasts, e.g., periodic CMAQ forecasts of Particulate Matter (e.g., having a diameter smaller than 2.5 microns (PM2.5), that are similar to a current forecast, and then applying errors from such past forecasts to improve the current forecast.

SUMMARY

One embodiment of the present invention includes a computer-implemented method for improving an air quality forecast accuracy. The method comprises: receiving, at a processor, a new air quality forecast value for a location at a future time; receiving, at a processor, historical air quality forecast values at the location and corresponding historical observed air quality values at time instances of a past time period; forming and ordering analog pairs, by the processor, of received historical observed air quality values with received historical air quality forecast values, the ordering based on a proximity of the historical air quality forecast value of an analog pair to the new air quality forecast value; computing, by the processor, an abnormal index (AI) value for each ordered analog pair; computing, by the processor, a dynamic weight for each analog pair whose computed AI value does not exceed a threshold AI value; and generating, by the processor, a modified forecast value by applying a bias as a function of the computed dynamic weights to the new air quality forecast value.

Other embodiments of the present invention include a computer-implemented system and a computer program product.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

It is to be understood that the present invention can be implemented in various manners, and thus should not be construed to be limited to the embodiments disclosed herein. On the contrary, the below-described embodiments are provided to facilitate understanding of the present invention, and convey the scope of the present invention to those skilled in the art.

An embodiment herein extends known analog forecast technique that applies analog post-processing to various meteorological forecasting problems. The analog method is to search for previous model forecasts that are similar to a current forecast to be corrected, and then to use the errors from those past predictions to correct a current forecast.

Figure 1:
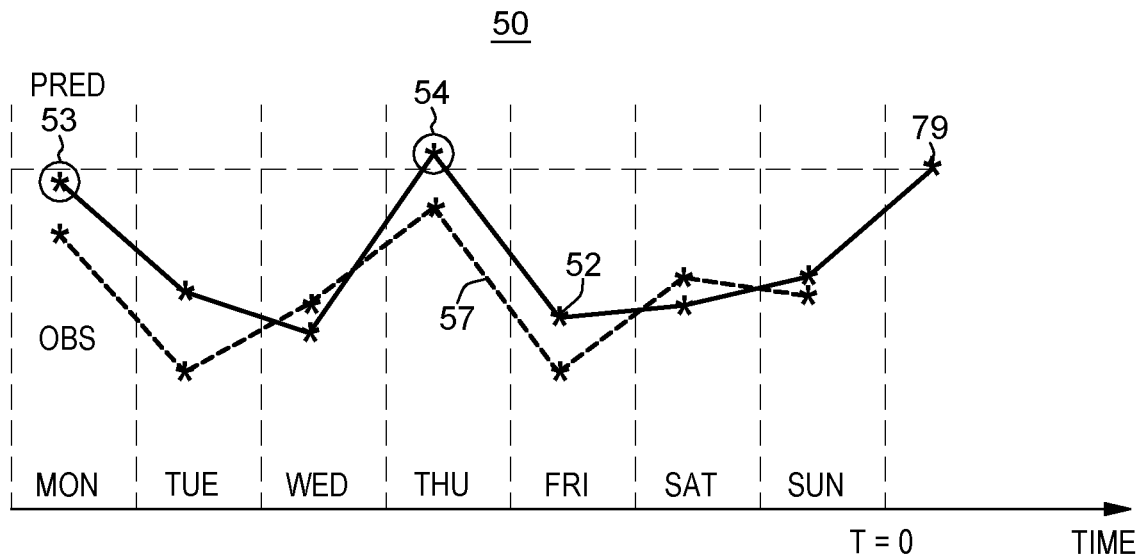
FIG. 1 graphically illustrates an example ensemble of past forecast analogs (past forecast predictions paired with the corresponding actual air quality observations) in one embodiment.
Figure 2:
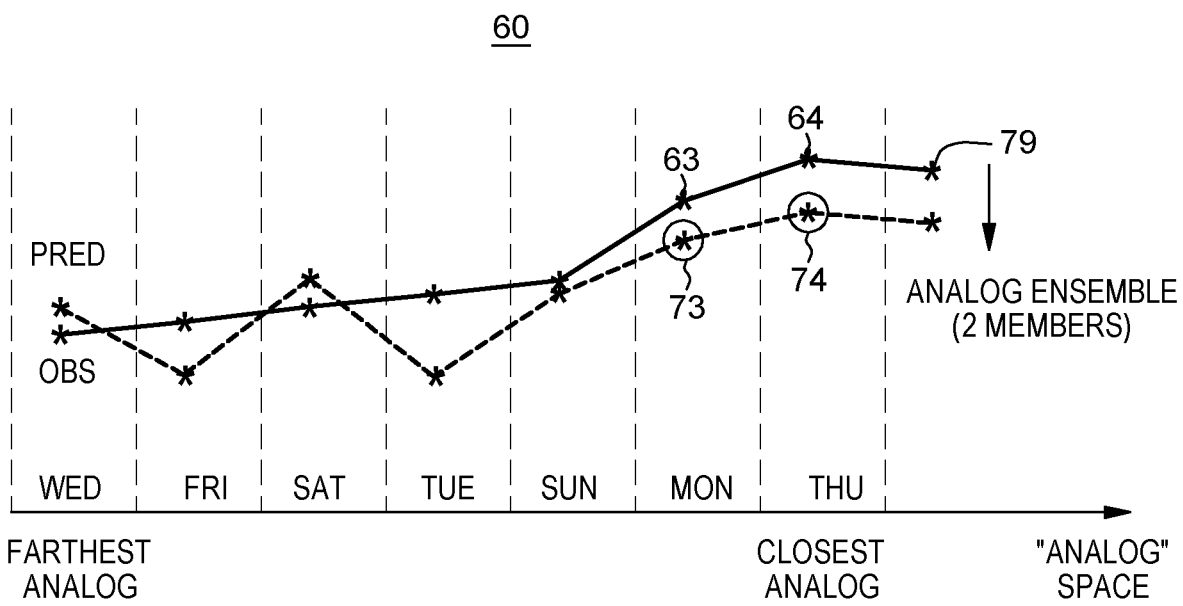
FIG. 2 graphically illustrates the example of FIG. 1, re-ordered based on a proximity of analogs.

One analog technique (i.e., air quality model forecast post-processing technique) according to an embodiment herein, is illustrated in FIGS. 1 and 2 in which a computing system applies a technique for an ensemble of forecasts having two closest analogs.

FIG. 1 graphically illustrates an example ensemble (time series) 50 of past forecast analogs (past forecast predictions paired with the corresponding actual air quality observations). In the example depicted in FIG. 1, the same hour and day are considered. A first (forecast) plot 52 is an example time series predicted by an Air Quality model, e.g., the National Oceanic and Atmospheric Administration's CMAQ model, over an eight day period, and the second plot 57 is an example corresponding set of actual observations values over the same time period. The forecast plot 52 includes a new (current) forecast value 79 (depicted to the right of the dashed line at time, t=0), while the portion of the forecast plot 52 to the left of the dashed line at time, t=0) represents the previous seven one-day forecast values. In the graphical illustration 50 of FIG. 1, representing the original time series, the analog technique searches for closest analogs, e.g., two analogs 53, 54 of which are previous forecasts at the same lead time instances that are closest to the current new forecast 79. The previous forecasts search may use a forecast search variable (e.g., PM2.5, etc.)

FIG. 2 graphically illustrates an example re-ordered form of the graph 50 of FIG. 1. As shown in FIG. 2, the time series 50 of FIG. 1 has been re-ordered, with the closest analog pair (historical forecast value and actual observed value) 64, 74 directly preceding (to the left of) the new (current) forecast value 79. The second closest analog pair (historical forecast value and actual observed value) 63, 73 are shown next (next closest to the left). The closest analog pair 64, 74 corresponds to the analog pair 54 (predicted value with its corresponding observed value) depicted in FIG. 1. Similarly analog pair 63, 73 corresponding to analog pair 53 (predicted value and its corresponding observed value) depicted in FIG. 1.

The observed values 74, 73 of FIG. 2 that correspond to the two best (closest) analog forecasts 64, 63 may then be weighted, according to how closely they resemble the current forecast, and their weighted sum provides a corrected forecast estimate. Although the example depicted in FIG. 2 shows only two closest analogs, in practice any number (one or a greater number) of analogs can be used.

Some embodiments can improve air quality forecasts via implementation of an abnormal index (sometimes referred to as an anomaly index or "AI"), which is computed based on several meteorology variables (e.g., humidity, pressure and temperature) and experience coefficients. In some embodiments (an example of which is described in more detail below), potentially erroneous information is excluded. In some embodiments, weightings may be dynamically applied to certain AI elements. As will be described in greater detail with regard to the examples below, embodiments using AI weightings can result in a higher forecast accuracy.

Table 1 shows, for an example new or current forecast value ($F_{new}$) (e.g., of an air quality PM prediction value of 78.5505 given certain meteorological conditions) at a certain time of a particular day at a particular location (e.g., Site 1).

TABLE 1

| new forecast ($F_{new}$) | history forecast | history obs | corrected forecast |
|---|---|---|---|
| 78.5505 | 76.8324 | 118.333 | 120.979 |
| | 65.1095 | 74.3478 | 89.6959 |
| | 64.0484 | 277 | 339.72 |
| | 64.0232 | 42.5417 | 52.1947 |
| | 94.5696 | 71.6667 | 59.5271 |

The first column of Table 1 indicates closest historical forecast analogs found in the search of previous forecasts such as has been predicted for the same time as the current forecast; a second column shows the actual historical observations for that value with each historical observation corresponding to each respective historical forecast; and a third column of corrected forecasts shows each corrected forecast value corresponding to each respective historical forecast at the same observation time as the current forecast. As shown, in each columns of Table 1, a value of the first closest analog to $F_{new}$ (e.g., history forecast value 76.8324) directly precedes the new forecast, and then the second closest forecast (forecast value 65.1095) next, etc.

Table 2 depicts a similar chart showing an further example new or current forecast value ($F_{new}$) (e.g., an air quality PM prediction value) at a certain time of a particular day at a different location (e.g., Site 2)

TABLE 2

| new forecast $F_{new}$ | history forecast | history obs | corrected forecast |
|---|---|---|---|
| 84.9239 | 83.2356 | 125.167 | 127.706 |
| | 74.0423 | 303.167 | 347.722 |
| | 71.8276 | 47.2727 | 55.8919 |
| | 98.1769 | 78.0833 | 67.5427 |
| | 70.9909 | 83.5909 | 99.9968 |

Table 2 show a first column of closest historical forecast analogs such as has been predicted for the same time as the current forecast; a second column shows the actual historical observations for that value with each historical observation corresponding to each respective historical forecast; and a third column shows corrected forecasts with each corrected forecast value corresponding to each respective historical forecast at the same observation time as the current forecast. As shown, in each columns, a value of the first closest analog (e.g., history forecast value 83.2356) directly precedes the new forecast (value 84.9239), and then the second closest forecast next, etc.

One aspect of the present invention includes generating an abnormal index (AI), which can be computed as a function of several meteorological variables (i.e., humidity, pressure and temperature) and two experience coefficients (also referred to as control parameters), with the AI computed according to equation (1) as follows:

$$AI = \frac{MI_{hist} - MI_{new}}{MI_{new}} \quad (1)$$

where MI represents an index of meteorological conditions that can be computed according to equation (2) below. In equation (1) above, $MI_{hist}$ represents a meteorological condition that is computed periodically, e.g., each day, of a historical period, $MI_{new}$ represents a currently computed meteorological condition. MI can be according to equation (2) as follows:

$$MI = \frac{Q*P}{a*e^{b*(T-273.16)/(T-35.86)}} \quad (2)$$

where a and b are control parameters (experience coefficients), Q represents a humidity value, P represents an air pressure value, and T represents an air temperature value. It is understood that during the history period, these meteorological elements are measured observations; whereas during the forecast period, the meteorological elements are forecast in real-time from the meteorology model.

In one embodiment, the control parameter value a=379.90516 and the control parameter value b=17.2693882, with these two parameters obtained from an empirical formula to calculate a Relative Humidity (RH).

Table 3 corresponds to Table 1, and showing the values of each of the columns of the chart for the example Site 1 location as depicted in Table 1. However, there is an additional column showing corresponding computed AI values, each AI value computed based on the historical values of MI, a, b, Q, P, T that were obtained (observed/measured) at that location for that same time of day as the corresponding forecasts. A last column of chart shows a single new observation value of 347.292 corresponding to the new forecast.

TABLE 3

| new forecast | history forecast | history obs | corrected forecast | AI | new obs |
|---|---|---|---|---|---|
| 78.5505 | 76.8324 | 118.333 | 120.979 | 33 | 347.292 |
| | 65.1095 | 74.3478 | 89.6959 | 48 | |
| | 64.0484 | 277 | 339.72 | 7 | |
| | 64.0232 | 42.5417 | 52.1947 | 39 | |
| | 94.5696 | 71.6667 | 59.5271 | 44 | |

Table 4 corresponds to Table 2, and showing the values of each of the columns of the chart for the example Site 2 location as depicted in Table 2. However, there is an additional column showing corresponding computed AI values, each AI value computed based on the historical values of MI, a, b, Q, P, T that were obtained (observed/measured) at that location for that same time of day as the corresponding forecasts. A last column of chart shows a single new observation value of 347.292 corresponding to the new forecast.

TABLE 4

| new forecast | history forecast | history obs | corrected forecast | AI | new obs |
|---|---|---|---|---|---|
|  | 83.2356 | 125.167 | 127.706 | 35 |  |
| 84.9239 | 74.0423 | 303.167 | 347.722 | 9 | 347.292 |
|  | 71.8276 | 47.2727 | 55.8919 | 46 |  |
|  | 98.1769 | 78.0833 | 67.5427 | 43 |  |
|  | 70.9909 | 83.5909 | 99.9968 | 49 |  |

For the air quality prediction examples of both Site 1 and Site 2 having values shown in Table 1 and Table 2, respectively, all the history analogs with the Abnormal Index larger than a value of AI=10 may be excluded. The threshold AI value above which analog pairs are to be excluded is configurable. In the case of Site 1, Table 3 shows the analog corresponding to the AI value of 7 would remain and the others excluded. In this example, this remaining analog is the closest analog and shows a corresponding new observation value 347.292 that is close to the corrected (historical) forecast value of 339.72. That is, this remaining analog is the closest one to the actual observation.

Similarly, for the case of Site 2, Table 4 the analog corresponding to the AI value of 9 would remain and the others excluded. In this example, this remaining analog is the closest analog and shows a corresponding new observation value 347.292 that is close to the corrected (historical) forecast value of 347.722. That is, this remaining analog is the closest one to the actual observation.

Further, in some embodiments, a method in accordance with the present invention includes computing a dynamic AI weight value. For each analog pair "i", the dynamic weight value can be computed as $w_i$ according to equation (3) as follows:

$$w_i = \frac{\left[\frac{D_{max} - D_i}{D_{max} \cdot D_i}\right]^2}{\sum_{i=1}^{n}\left[\frac{D_{max} - D_i}{D_{max} \cdot D_i}\right]^2} \quad (3)$$

where D is computed at each forecast and D represents the absolute difference of AI, i.e., $|AI-AI_{min}|$, where AI is the calculated abnormal index based on the forecast meteorological variables, $AI_{min}$ is the smallest computed AI (anomaly index) value based on the historical forecast meteorological variables. For instance given computed AI values of {27, 35, 28, 10}, the $AI_{min}$ is 10, and $|AI-AI_{min}|$ becomes {17, 25, 18, 0}. $D_{max}$ is computed as the maximum of D among the n analogs, e.g., $\{D_1, D_2, \ldots, D_n\}$ and n is the number of analogs excluding the abnormal ones. That is, n is the number of the dataset members for training a forecast value. The abnormal ones are excluded from this dataset. The abnormal analog is determined by a value of the computed AI, where the larger the AI, the more abnormal.

The improved (corrected) forecast $F_{corrected}$ is computed according to equation (4) as follows:

$$F_{corrected} = \left[\sum_{i=1}^{n} R_i \cdot w_i\right] \cdot F_{new} \quad (4)$$

where $F_{new}$ is the current (new) air quality forecast, $R_i$ is the ratio of the history observed air quality value divided by the corresponding air quality forecast value, where $w_i$ is the dynamic weight value computed according to equation (3) and "n" is the number of the dataset members for training the forecast value.

For example, given computed values:
$w_i = \{0.35, 0.3, 0.3, 0.05\}$; $R_i = \{0.7, 0.78, 0.6, 0.5\}$; $F_{new} = 100$
Then, according to the equation (3), the corrected new forecast becomes:

$F_{corrected} = (0.35*0.7+0.3*0.78+0.3*0.6+ 0.05*0.5)*100=68.4$

Figure 3:
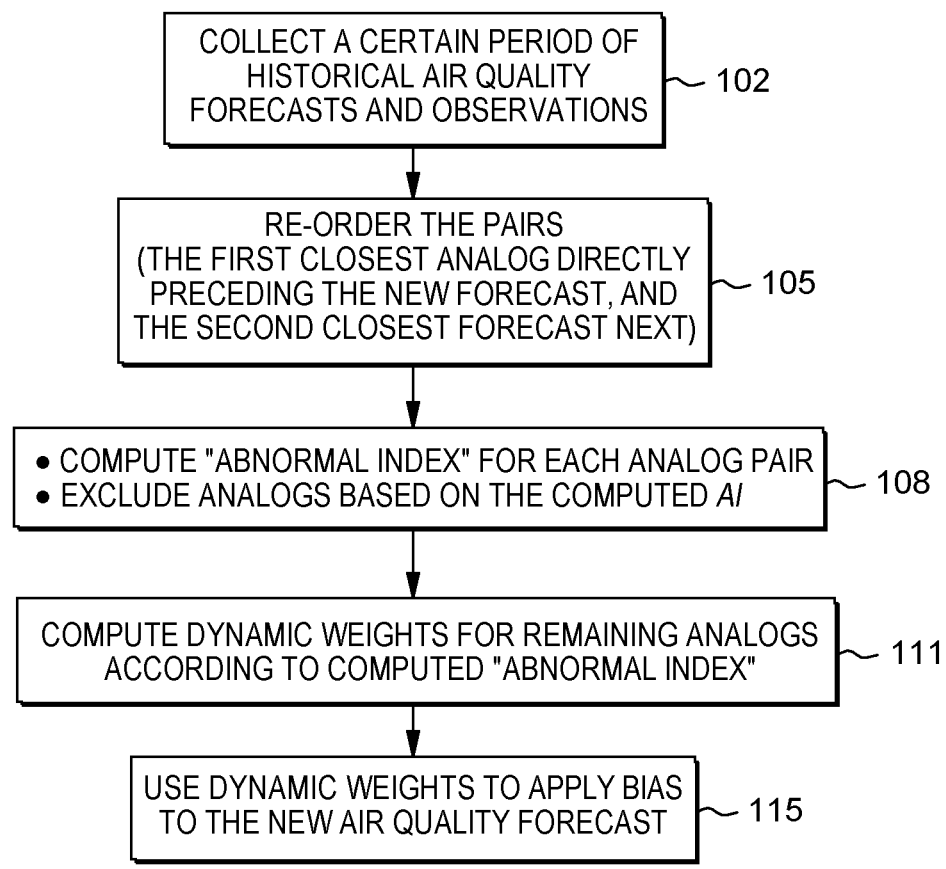
FIG. 3 depicts a post-processing air quality forecast method 100, in accordance with the present invention.

FIG. 3 depicts an example post-processing of air quality forecast method 100 according to some embodiments. In step 102 certain historical forecasts, e.g., such as generated by using the NOAA's CMAQ model, and corresponding observations are collected over a period of time. In some embodiments, collected data includes historical sites observation data and the numerical air quality model historical forecast data, collected during the same time period. For example, the collected data can include the forecasted air quality values such as shown in the Tables 1 and 2 over a period of time. Other collected values may include historical observed values such as found in Tables 1 and 2 may include the observed (e.g., measured) Q (humidity), P (air pressure), and T (air temperature) values over the historical time series that were used in computing the air quality values in the Tables 1 and 2.

Returning now FIG. 3, in step 105, historical forecast analogs and corresponding actual historical observation data for that forecast data are paired as analogs (site by site and time by time) such as shown in the first two columns of Tables 1 and 2, and the pairs of analogs are re-ordered e.g., such as described herein with respect to FIG. 2. In one embodiment, the re-ordering includes selecting one or more pairs whose historical forecast results are closest to the forecast result for the future, e.g., taking a first closest analog directly preceding the new forecast, and the second closest forecast next, etc. In one embodiment, step 105 includes computing the AI for each analog pair as a function of the several meteorology variables (i.e., humidity, pressure and temperature), and the two experience coefficients as according to equations (1) and (2). For example, corresponding columns of Tables 3 and 4 show corresponding AI's computed for each of the historical forecast values at each observation period.

Returning again to FIG. 3, in step 108, FIG. 3, certain analogs are excluded based on the AI computed for each analog. By way of further example, analogs having a computed AI according to equations (1) and (2) that exceeds a threshold value, e.g., AI=10, can be excluded; and with further reference to the computed Abnormal Index (AI) values shown in Tables 3 and 4, all the history analogs with a computed Abnormal Index value larger than 10, for example, would be excluded. Referring now also to the exemplary computed AI value of 7 in Table 3 (which is not larger than 10), would indicate that the historical forecast value in that row as the closest analog to the corresponding actual (history obs) observation value and the remaining values in other rows of Table 3 would be excluded in the computation of the current forecast. Similarly, the computed AI value of 9 in Table 4 indicates that historical forecast as the closest analog to the actual observation and the remaining values in other rows of Table 4 would be excluded in the computation of the current forecast.

Figure 5:
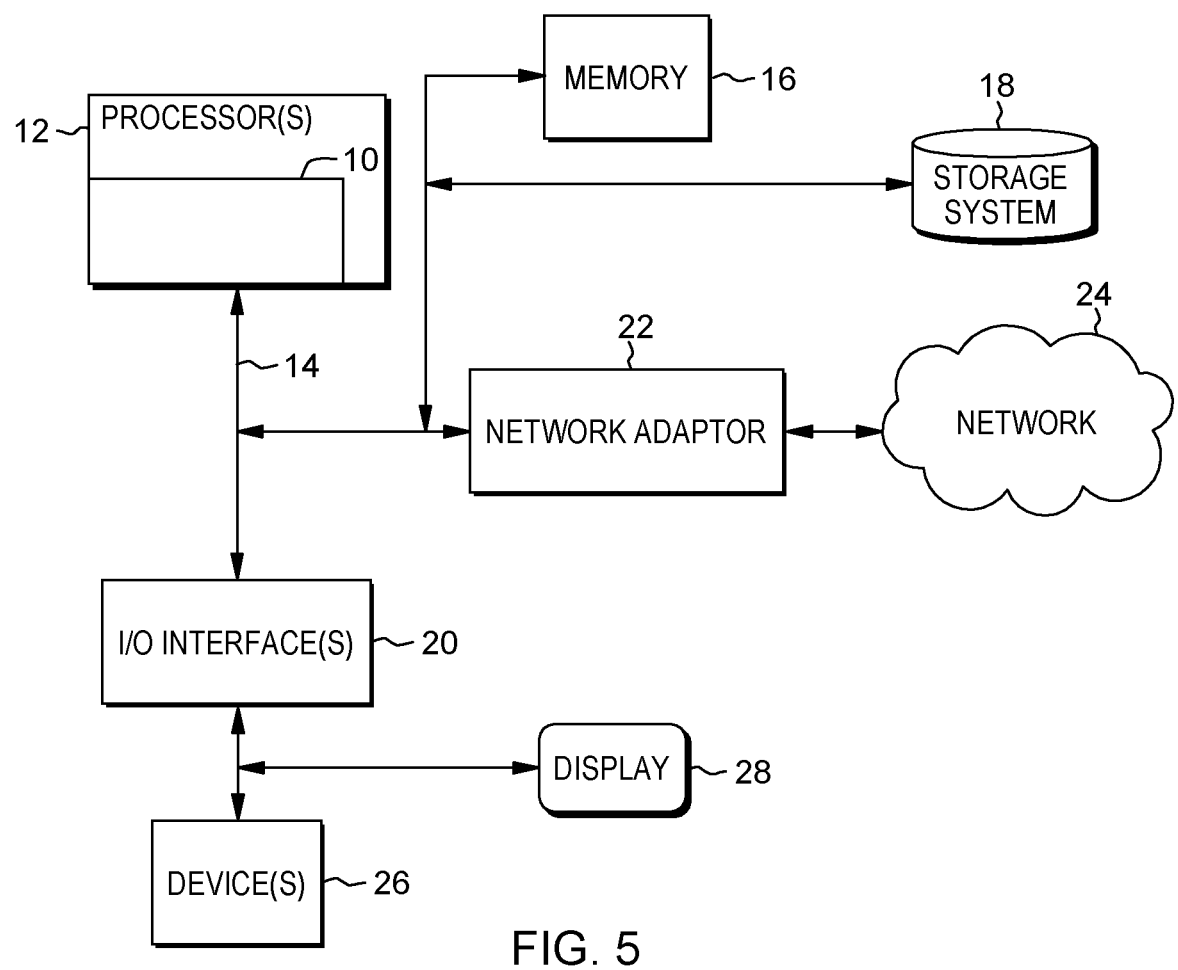
FIG. 5 illustrates an example computing system, in accordance with the present invention.

Continuing to step 111 of FIG. 5, the remaining analog(s) are weighted according to the AI, i.e., by computing the dynamic weight $w_i$ for the rest of the analogs according to the AI computed for the respective analog i according to equation (3). In some embodiments, a mean bias of the remaining pairs is applied to the future forecast result. In step 115, a bias from the history data can be applied to the newly forecast value. For example, the bias term $$\left[\sum_{i=1}^{n} R_i \cdot w_i\right].$$

is applied to $F_{new}$, according to equation (4), where $F_{new}$ is the current (new) air quality forecast, $R_i$ is the ratio of the history observation divided by the corresponding forecast where $w_i$ is the dynamic weight value.

Figure 4A:
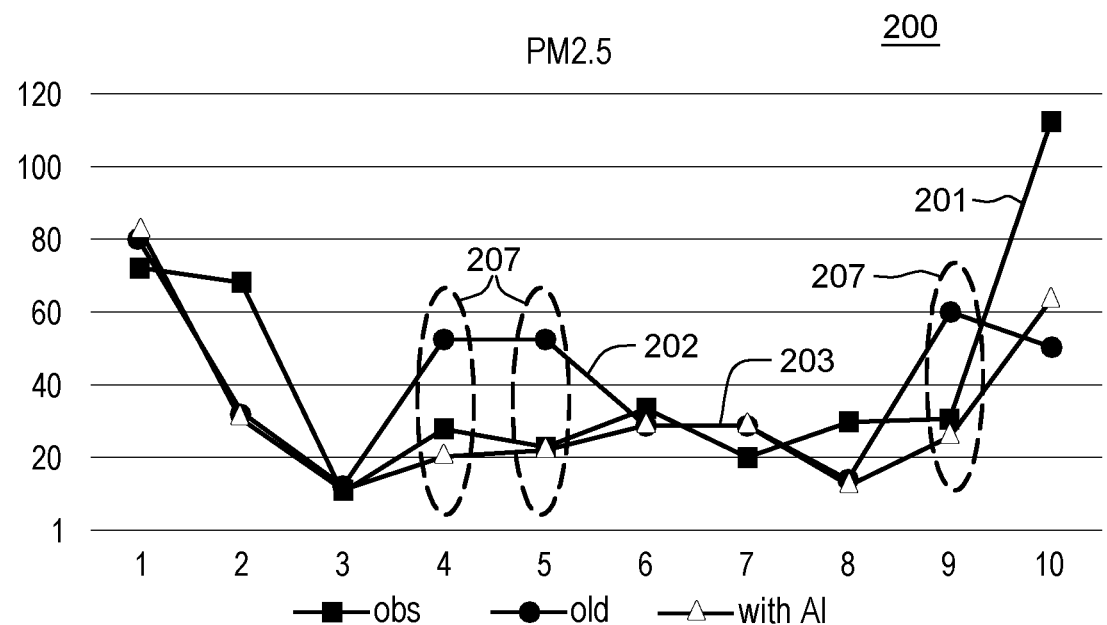
FIG. 4A shows a plot of example observations of atmospheric PM2.5 concentration (y-axis), corresponding forecast results over an example ten day period (x-axis) and corresponding example AI values computed at the same time instances for the example first location.
Figure 4B:
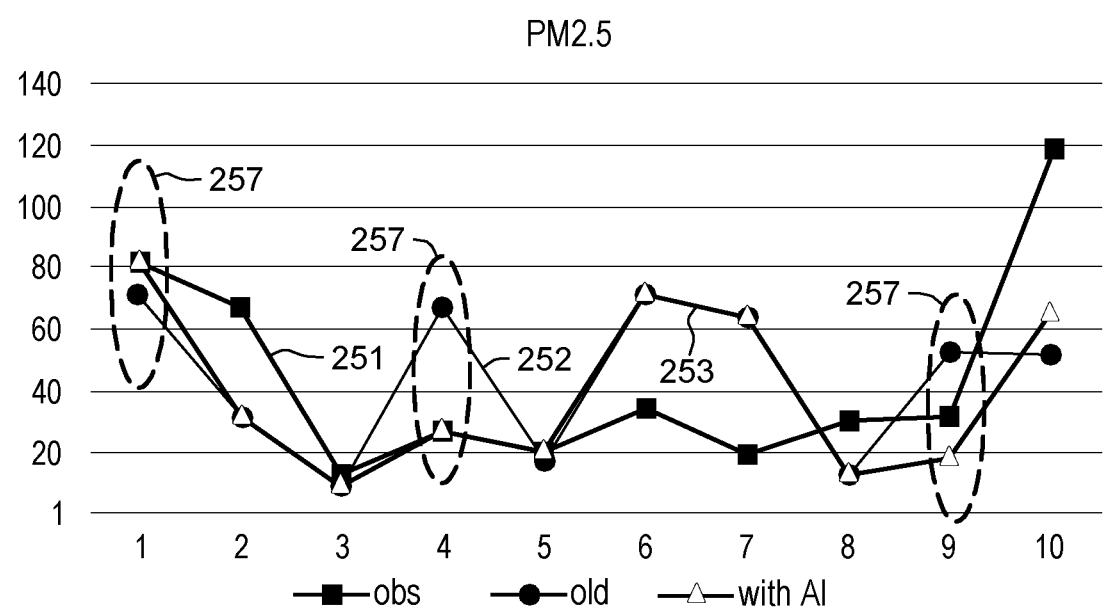
FIG. 4B shows a plot of example observations of atmospheric PM2.5 concentration, corresponding forecast results over a similar ten day period, and corresponding example AI values computed at the same time instances, for the example second location.

FIG. 4A shows a plot 200 of example observations of atmospheric PM2.5 concentration (y-axis) and corresponding forecast results over an example ten day period (x-axis), e.g., for example Site 1. The ten day period is non-limiting and any time period can be implemented. FIG. 4B shows a plot 250 of example observations of atmospheric PM2.5 concentration and corresponding forecast results over a similar ten day period, e.g., for example at Site 2.

For each example plot, the respective ten days' forecast results show the PM2.5 concentration in units of microgram per cubic meters. FIG. 4A shows a first plot 201 of observation PM2.5 values at each day of the period, a second plot 202 show the forecast values after using a traditional analogue forecasting method, and a third plot 203 shows the forecast values using the method described with respect to FIG. 3. The circles 207 show the cases where the method improves the forecast results by pushing the forecasts to the observations. FIG. 4B shows a first plot 251 of observation PM2.5 values at each day of the period, a second plot 252 show the forecast values after using a traditional analogue forecasting method, and a third plot 253 shows the forecast values using the method described with respect to FIG. 3. The circles 257 show the cases where the method improves the forecast results by pushing the forecasts to the observations.

It is understood that besides providing more accurate PM2.5 forecasts, the methods herein are extendable to air quality predictions of other pollutants, including, but not limited to, PM10, SO2, CO, NO2, O3, and an AQI (Air Quality Index).

FIG. 5 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIG. 5).

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented system comprising:
a processor;
a memory coupled to the processor, wherein the memory stores program instructions which, when executed by the processor, cause the processor to:
receive a new air quality forecast value for a location at a future time;
receive historical air quality forecast values at the location and corresponding historical observed air quality values at time instances of a past time period;
form and order analog pairs of received historical observed air quality values with received historical air quality forecast values, said processor configured to order said analog pairs based on a proximity of an historical air quality forecast value of an analog pair to said new air quality forecast value;
compute an abnormal index (AI) value for each ordered analog pair, said abnormal index of an ordered pair computed as a function of a first historical meteorological index computed for a past time period and a second new meteorological index computed for a current time instance, the first meteorological index computed as a function of meteorological condition values obtained at the time instances during the past time period; and the second new meteorological index being computed as a function of meteorological condition values at a current time instance;
compute a dynamic weight for each analog pair whose computed AI value does not exceed a threshold AI value;
generate a modified forecast value by applying a bias as a function of said computed dynamic weights to said new air quality forecast value; and
use said modified forecast value to control, at a device, a particulate pollutant emission that improves air quality for the location at the future time.

2. The computer-implemented system of claim 1, wherein said instructions further configure said processor to:
select one or more analog pairs whose historical forecasted air quality value results closest to the forecasted air quality value for the future time; and
re-order the pairs of analogs based on the selecting.

3. The computer-implemented system of claim 1, wherein to apply a bias based on said dynamic weights, said instructions further configure said processor to:
compute a ratio of the historical observed air quality values divided by the corresponding air quality forecast value; and
compute said bias as a function of said dynamic weight and said ratio.

4. The computer-implemented system of claim 3, wherein to compute said applied bias, said instructions further configure said processor to compute:

$$\sum_{i=1}^{n} R_i \cdot w_i$$

where $R_i$ is the computed ratio of the historical observed air quality value divided by the corresponding air quality forecast of an analog pair i, $w_i$ is the dynamic weight value, and n is the number of the remaining closest analog pairs that are used for generating the modified forecast value.

5. The computer-implemented system of claim 4, wherein to compute said dynamic weight for an analog pair, said instructions further configure said processor to compute:

$$w_i = \frac{\left[\frac{D_{max} - D_i}{D_{max} \cdot D_i}\right]^2}{\sum_{j=1}^{n}\left[\frac{D_{max} - D_i}{D_{max} \cdot D_i}\right]^2}$$

where D is an absolute difference computed according to: $D=|AI-AI_{min}|$, where said AI is the computed abnormal index calculated based on meteorological condition values at the current time instance, $AI_{min}$ is a minimum abnormal index calculated based on the meteorological condition values obtained during the past time period, and $D_{max}$ is a maximum value of D among the analog pairs whose value does not exceed the threshold.

6. The computer-implemented system of claim 5, wherein the abnormal index AI is computed according to:

$$AI = \frac{MI_{hist} - MI_{new}}{MI_{new}}$$

where, $MI_{hist}$ represents said first historical meteorological index, and $MI_{new}$ represents said second current meteorological index, where $MI_{hist}$ or $MI_{new}$ is computed according to:

$$MI = \frac{Q*P}{a*e^{b*(T-273.16)/(T-35.86)}},$$

a, b are control parameters or experience coefficients, Q represents the humidity value, P represents the air pressure value, and T represents the air temperature value, wherein for $MI_{hist}$ said Q, P, and T values are said meteorological condition values obtained during the past time period, and for $MI_{new}$ said Q, P, and T values are said meteorological condition values obtained at the current time instance.

7. A computer program product comprising a non-transitory computer-readable storage medium having a computer-readable program stored therein, wherein the computer-readable program, when executed on a computing device including at least one processor, causes the at least one processor to:
  receive a new air quality forecast value for a location at a future time;
  receive historical air quality forecast values at the location and corresponding historical observed air quality values at time instances of a past time period;
  form and order analog pairs of received historical observed air quality values with received historical air quality forecast values, said ordering based on a proximity of an historical air quality forecast value of an analog pair to said new air quality forecast value;
  compute an abnormal index (AI) value for each ordered analog pair, said abnormal index computed as a function of a first historical meteorological index, the first meteorological index being computed as a function of meteorological condition values obtained at the time instances during the past time period; and a second new meteorological index, the second new meteorological index being computed as a function of meteorological condition values at a current time instance, said abnormal index of an analog pair being a function of said first historical meteorological index computed for the past time period and the computed second current meteorological index for the current time;
  compute a dynamic weight for each analog pair whose computed AI value does not exceed a threshold AI value;
  generate a modified forecast value by applying a bias as a function of said computed dynamic weights to said new air quality forecast value; and
  use said modified forecast value to control, at a device, a particulate pollutant emission that improves air quality for the location at the future time.

8. The computer program product of claim 7, wherein to apply said bias based on said dynamic weights, said computer-readable program configures said at least one processor to:
  compute a ratio of the historical observed air quality values divided by the corresponding air quality forecast value; and
  compute said bias as a function of said dynamic weight and said ratio.

9. The computer program product of claim 8, wherein to compute said bias based on said dynamic weights, said computer-readable program configure said at least one processor to compute:

$$\sum_{i=1}^{n} R_i \cdot w_i$$

where $R_i$ is the computed ratio of the historical observed air quality value divided by the corresponding air quality forecast of an analog pair i, $w_i$ is the dynamic weight value, and n is the number of the remaining closest analog pairs that are used for generating the modified forecast value.

10. The computer program product of claim 9, wherein to compute said dynamic weight for an analog pair, said computer-readable program configure said at least one processor to compute:

$$w_i = \frac{\left[\frac{D_{max} - D_i}{D_{max} \cdot D_i}\right]^2}{\sum_{j=1}^{n}\left[\frac{D_{max} - D_i}{D_{max} \cdot D_i}\right]^2}$$

where D is an absolute difference computed according to: $D = |AI - AI_{min}|$, where said AI is the computed abnormal index calculated based on meteorological condition values at the current time instance, $AI_{min}$ is a minimum abnormal index calculated based on the meteorological condition values obtained during the past time period, and $D_{max}$ is a maximum value of D among the analog pairs whose value does not exceed the threshold.

11. The computer program product of claim 10, wherein the abnormal index AI is computed according to:

$$AI = \frac{MI_{hist} - MI_{new}}{MI_{new}}$$

where, $MI_{hist}$ represents said first historical meteorological index, and $MI_{new}$ represents said second current meteorological index, where $MI_{hist}$ or $MI_{new}$ is computed according to:

$$MI = \frac{Q * P}{a * e^{b*(T-273.16)/(T-35.86)}},$$

a, b are control parameters or experience coefficients, Q represents the humidity value, P represents the air pressure value, and T represents the air temperature value, wherein for $MI_{hist}$ said Q, P, and T values are said meteorological condition values obtained during the past time period, and for $MI_{new}$ said Q, P, and T values are said meteorological condition values obtained at the current time instance.

* * * * *